US005728750A

United States Patent [19]
Schwalm et al.

[11] Patent Number: 5,728,750
[45] Date of Patent: Mar. 17, 1998

[54] RADIATION-CURABLE COMPOSITIONS COMPRISING POLYFUNCTIONAL ACRYLATES AND CAPPED AMINES

[75] Inventors: Reinhold Schwalm, Wachenheim; Wolfgang Reich, Maxdorf; Lukas Häussling, Bad Dürkheim; Erich Beck, Ladenburg, all of Germany

[73] Assignee: BASF Aktiengesellschaft, Ludwigshafen, Germany

[21] Appl. No.: 654,732

[22] Filed: May 29, 1996

[30] Foreign Application Priority Data

Jun. 8, 1995 [DE] Germany ............... 195 20 888.9

[51] Int. Cl.$^6$ ............... C08F 2/46; C08F 2/48; C08G 69/44; C09D 4/02
[52] U.S. Cl. ............... 522/173; 522/66; 522/170; 522/174; 522/182; 522/65
[58] Field of Search ............... 522/66, 90, 100, 522/103, 173, 174, 65, 182, 170

[56] References Cited

U.S. PATENT DOCUMENTS 3,844,916 10/1974 Gaske ............... 204/159.16
4,239,848 12/1980 Adin et al. ............... 430/270

FOREIGN PATENT DOCUMENTS 2 346 424   4/1974   Germany .
WO 89/07123  8/1989   WIPO .
WO 93/21240 10/1993   WIPO .
WO 94/28075 12/1994   WIPO .

OTHER PUBLICATIONS

Database WPI, Derwent Publications, AN–94–023040, JP–A–05–331366, Dec. 14, 1993.

*Primary Examiner*—Susan W. Berman
*Attorney, Agent, or Firm*—Oblon, Spivak, McClelland, Maier & Neustadt, P.C.

[57] ABSTRACT

Radiation-curable compositions comprising a) compounds having at least two carbon-carbon double bonds with which it is possible for primary or secondary amino groups to form adducts in the form of a Michael-analogous addition reaction (referred to in short below as activated double bonds)

b) capped amino compounds which on irradiation with high-energy light liberate amino compounds having primary, secondary or primary and secondary amino groups, the overall number of hydrogen atoms bonded in the amino groups (amine hydrogen atoms) being at least 2.

8 Claims, No Drawings

RADIATION-CURABLE COMPOSITIONS COMPRISING POLYFUNCTIONAL ACRYLATES AND CAPPED AMINES

The invention relates to radiation-curable compositions comprising a) compounds having at least two carbon-carbon double bonds with which it is possible for primary or secondary amino groups to form adducts in the form of a Michael-analogous addition reaction (referred to in short below as activated double bonds)

b) capped amino compounds which on irradiation with high-energy light liberate amino compounds having primary, secondary or primary and secondary amino groups, the overall number of hydrogen atoms bonded in the amino groups (amine hydrogen atoms) being at least 2.

The invention additionally relates to the use of the radiation-curable compositions for producing coatings and moldings.

Acrylate-containing coatings are generally cured photochemically by free-radical polymerization. The Michael-analogous addition reaction of amines with acrylates is likewise known in order, for example, to modify acrylate resins, as described in DE-A-23 46 424. In this case, the amines employed in small quantities add onto the double bond by Michael-analogous reaction. The Michael adducts bring about an increase in the reactivity in the subsequent polymerization of the excess acrylic double bonds by irradiation with UV light.

Free-radical reactions, such as the polymerization of acrylic double bonds, are often associated with disadvantages which consist, inter alia, in the possibility of side reactions, such as oxidation or grafting reactions, or for example in the inhibition of the reaction by oxygen.

There therefore continues to be a need for alternative photochemically induced curing systems.

It is therefore an object of the present invention to provide such alternative curing systems.

We have found that this object is achieved by the radiation-curable compositions defined above and by their use for the production of coatings and moldings.

The present invention relates to a novel, photochemically induced curing system in which capped amino compounds form amino compounds having a total of at least 2 amine hydrogen atoms only by irradiation with high-energy light. The amino compounds obtained are, correspondingly, capable at least twice of Michael addition reaction with acrylic groups. Following formation of the amino compound from the capped amino compound, therefore, the Michael addition reaction with the acrylic groups leads to the cured product.

The novel radiation-curable compositions comprise compounds a) and capped amino compounds b).

Compounds a) contain at least 2, preferably from 2 to 20, very preferably from 2 to 10 and particularly preferably from 2 to 6 carbon-carbon double bonds with which primary or secondary amino groups are able to form adducts in the form of a Michael addition reaction. Double bonds at which such addition may occur are in general activated double bonds, preferably double bonds which are substituted by at least one, preferably one or two, particularly preferably one group Z.

Z is a group selected from

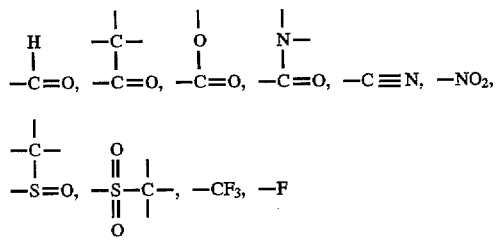

The free valencies in the above formulae are occupied, for example, preferably by a hydrogen atom and/or an organic radical.

Z is particularly preferably a group

Examples of suitable compounds a) are polyesters as are obtainable by condensation of maleic acid or fumaric acid with polyhydric alcohols, especially dihydric to hexahydric alcohols. These are preferably low molecular weight alcohols having a molecular weight of below 5000 g/mol, in particular below 2000 g/mol, particularly preferably below 500 g/mol.

Particularly preferred compounds a) are acrylate compounds, ie. those having acrylic groups as activated double bonds.

Acrylate compounds a) include derivatives not only of acrylic acid but also of methacrylic acid. However, acrylic acid derivatives are preferred.

The acrylate compounds a) contain on average preferably from 2 to 20, very preferably from 2 to 10 and particularly preferably from 2 to 6 acrylic groups in the molecule.

The number-average molecular weight $M_n$ of the compounds a), especially acrylate compounds, is preferably below 15,000 g/mol, very preferably below 5000 g/mol and particularly preferably below 3000 g/mol (determined by gel permeation chromatography using polystyrene as standard and tetrahydrofuran as eluent).

Examples of acrylate compounds are acrylic esters of polyfunctional alcohols, especially those which apart from the hydroxyl groups contain either no further functional groups or only ether groups. Examples of such alcohols are bifunctional alcohols, such as ethylene glycol and propylene glycol, and the glycols with higher degrees of condensation, such as diethylene glycol, triethylene glycol, dipropylene glycol, tripropylene glycol, etc., butanediol, pentanediol, hexanediol, neopentylglycol, alkoxylated phenolic compounds, such as ethoxylated or propoxylated bisphenols, cyclohexanedimethanol, trifunctional and higher polyfunctional alcohols, such as glycerol, trimethylolpropane, butanetriol, trimethylolethane, pentaerythritol, ditrimethylolpropane, dipentaerythritol, sorbitol, mannitol and the corresponding alkoxylated alcohols, especially ethoxylated and propoxylated alcohols.

The alkoxylation products can be obtained in a known manner by reacting the above alcohols with alkylene oxides, especially ethylene oxide or propylene oxide. The degree of alkoxylation per hydroxyl group is preferably from 0 to 10, ie. 1 mol of hydroxyl group can preferably be alkoxylated with up to 10 mol of alkylene oxides.

Further acrylate compounds are polyester acrylates, which are the acrylic esters of polyesterols.

Examples of suitable polyesterols are those which can be prepared by esterifying polycarboxylic acids, preferably dicarboxylic acids, with polyols, preferably diols. The starting materials for such hydroxyl-containing polyesters are known to the person skilled in the art. Dicarboxylic acids which can be employed with preference are succinic acid, glutaric acid, adipic acid, sebacic acid, o-phthalic acid, their isomers and hydrogenation products and esterifiable derivatives, such as anhydrides or dialkyl esters of said acids. Suitable polyols are the abovementioned alcohols, preferably ethylene glycol, 1,2-propylene glycol and 1,3-propylene glycol, 1,4-butanediol, 1,6-hexanediol, neopentylglycol, cyclohexanedimethanol and polyglycols of the ethylene glycol and propylene glycol type.

Polyester acrylates can be prepared in two or more stages or else in one stage, as described for example in EP 279 303, from acrylic acid, polycarboxylic acid and polyol.

Examples of other compounds a) may be epoxy acrylates or urethane acrylates.

Examples of epoxy (meth)acrylates are those obtainable by reaction of epoxidized olefins or poly- and/or diglycidyl ethers, such as bisphenol A diglycidyl ether, with (meth) acrylic acid.

The reaction is known to the person skilled in the art and is described for example in R. Holmann, U.V. and E.B. Curing Formulation for Printing Inks and Paints, London 1984. In the case of urethane acrylates, these are, in particular, reaction products of hydroxyalkyl acrylates with poly- and/or diisocyanates (see again R. Holmann, U.V. and E.B. Curing Formulation for Printing Inks and Paints, London 1984).

It is of course also possible to employ mixtures of various compounds a), especially including mixtures of the above acrylates.

In addition to the compounds a) the compositions of the invention contain capped amino compounds b). On irradiation with high-energy light, compounds containing one or more amino groups are formed or released, which are able to form adducts with activated double bonds, for example acrylic double bonds, in accordance with a Michael addition reaction.

Adduct formation may take place, for example, as follows:

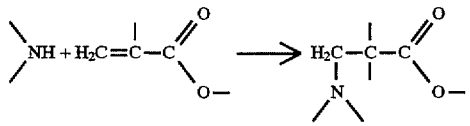

The number of hydrogen atoms bonded in the amino group or groups (amine hydrogen atoms) is at least 2. Their number is preferably from 2 to 6, in particular from 2 to 4.

Since the number of amine hydrogen atoms is at least 2, then correspondingly addition takes place onto at least 2 activated double bonds or acrylic groups.

In the case of a primary amino group (2 amine hydrogen atoms), addition first takes place onto an activated double bond, producing a secondary amino group. This group is able to add onto a further activated double bond. Compounds having two primary amino groups (4 amine hydrogen atoms) can, correspondingly, form adducts with 4 activated double bonds, and compounds having 2 secondary amino groups can, correspondingly, form adducts with 2 activated double bonds.

In every case, such addition leads to chain-extension or crosslinking, ie. to curing (referred to in short below as Michael-analogous curing). The molar ratio of activated double bonds, especially acrylic groups, to amine hydrogen atoms is preferably at least 1:0.2 in order to obtain adequate curing. The compounds b) can also be employed in excess based on the activated double bond.

However, there appears little advantage in exceeding a molar ratio of, for example, 1:1.2, preferably 1:1, since of course no more than equimolar quantities react.

The ratio of activated double bonds to amine hydrogen atoms is preferably at least 1:0.4, particularly preferably at least 1:0.8.

Compounds b) per se are known.

They are, for example, complex compounds in which amino compounds are attached to a central metal atom. In this form the amino groups are not reactive, ie. cannot undergo reaction by Michael addition. By irradiation with high-energy light the amino compounds are liberated from the metal complexes.

Examples of suitable complex compounds are cobalt(III) -amine complexes as described in S. K. Weit, C. Kutal and R. D. Allen, Chem. Mater. 4 (1992) 453–457.

Compounds b) may also in particular be amino compounds in which the amino groups are masked by photolabile, organic protecting groups. By irradiation with high-energy light, the protecting groups are removed and the amino compounds liberated. Corresponding compounds are described in V. N. R. Pillai, Photoremovable Protecting Groups in Organic Synthesis, Synthesis, January 1980, page 1–26.

The photolabile or photoremovable groups are, for example, dimethyl-3,5-dimethoxybenzyloxycarbonyl, benzyloxycarbonyl or 3-nitrophenyl, a phenacyl group, a 3,5-dimethoxybenzoinyl group, or 2-nitrobenzyl groups. Specific examples of the latter are 2-nitrobenzyl, α-substituted 2-nitrobenzyl groups, 2-nitrobenzyloxycarbonyl and α-substituted 2-nitrobenzyloxycarbonyl groups, and 2-nitrophenylethylene glycol group.

Amino compounds masked with the latter can preferably be prepared by reacting corresponding nitrobenzyl alcohols with isocyanates, such as aliphatic, cycloaliphatic and aromatic diisocyanates, for example 1,4-butane diisocyanate, 1,6-hexane diisocyanate, 2,2,4- and 2,4,4-trimethylhexamethylene diisocyanate, cyclohexane diisocyanate, methylcyclohexane diisocyanate, isophorone diisocyanate, 4,4'-diisocyanatodiphenylmethane, 4,4'-diisocyanatodicyclohexylmethane, 2,4- and 2,6-tolylene diisocyanate, tetramethylxylylene diisocyanate or else addition products of, in particular, diisocyanates, which products contain uretdione, biuret and isocyanurate groups.

The text below gives some example reactions for the liberation of amino compounds by irradiation.

1. from cobalt(III)-amine complexes

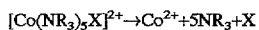

2. from amines masked with photolabile organic protecting groups a) benzyloxycarbonyl protecting groups

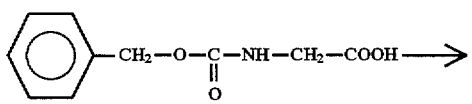

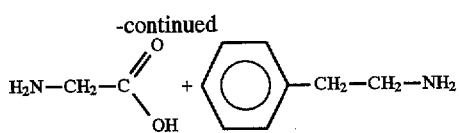

b) nitrobenzyl- or dinitrobenzyl-substituted carbamate protecting group

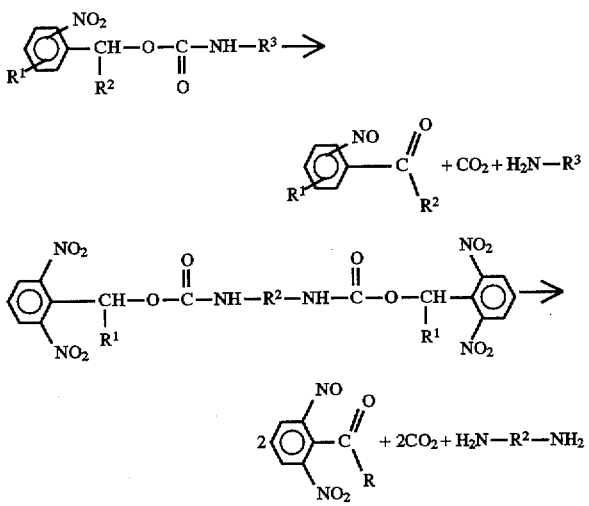

c) dimethyl-3,5-dimethoxybenzyloxycarbonyl group

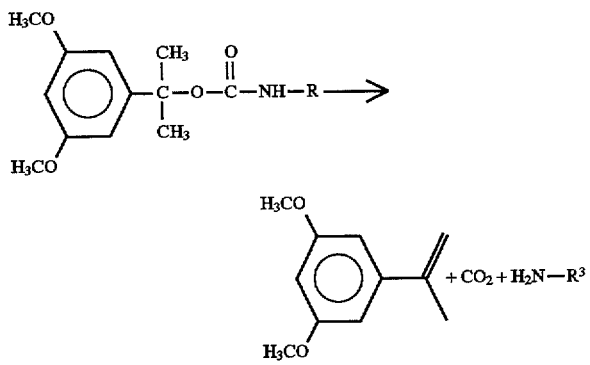

d) 3-nitrophenyl group

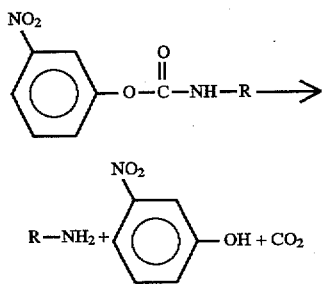

In general the compounds b) are preferably low molecular weight compounds, especially those with a molecular weight of below 500 g/mol.

The amino compounds liberated from the compounds are preferably low molecular weight aromatic or, in particular, aliphatic amino compounds having a molecular weight which is likewise below 500 g/mol, particularly preferably below 300 g/mol, and as already stated above with preferably from 2 to 6 amine hydrogen atoms, for example one primary amino group, two secondary amino groups or else two primary amino groups.

The novel compositions can comprise further constituents in addition to compounds a) and b).

Suitable examples are compounds having an acrylic group and which, like compounds a), undergo Michael addition with the amino groups, but which because of their monofunctionality cause chain termination and become attached at the ends.

The novel composition can also have added to it other ethylenically unsaturated copolymerizable compounds.

The overall content, in the novel composition, of unsaturated copolymerizable compounds is made up, for example, preferably as follows:

from 50 to 100% by weight, particularly preferably from 80 to 100% by weight and very preferably from 95 to 100% by weight of compounds a)

from 0 to 20% by weight, particularly preferably from 0 to 10% by weight and very preferably from 0 to 5% by weight of compounds (a') having an acrylic group, and from 0 to 50% by weight, particularly preferably from 0 to 20% by weight and very preferably 0% by weight of further ethylenically unsaturated copolymerizable compounds (a").

In the case where the latter further compounds are used and/or the compounds a) are employed with a molar excess of acrylic groups relative to the amine hydrogen atoms of b), the curing of the composition can also take place in part by means of free-radical copolymerization. For this purpose it is possible to add a photoinitiator for the free-radical polymerization, which on irradiation with UV light causes additional free-radical curing. The novel compositions can, however, be cured by means of the Michael-analogous curing alone.

The novel compositions cure to give tack-free coatings or moldings which have good mechanical properties, for example a high degree of hardness and good elastic properties.

The composition may comprise additives which are customary for the intended use.

In the case where it is used as a coating composition, for example, these additives may be pigments, dyes, fillers, etc.

Solvents as well can be added to the novel compositions in order, for example, to establish the processing viscosity.

Particularly suitable solvents are those in which compounds a) are also readily soluble, examples being dimethylformamide, N-methylpyrrolidone, butyl acetate, methylpropylene glycol acetate and diethylene glycol dimethyl ether.

The radiation curing of the novel compositions employs high-energy light at the wavelength at which, depending on the nature of the compounds b), the amino compounds are liberated. The Michael addition reaction takes place spontaneously, immediately following the liberation of the amino compounds. In order to accelerate the Michael addition reaction it is possible for the temperature during irradiation or thereafter to be held at from 40° to 120° C. In general, however, no temperature increase is necessary.

Where additional free-radical curing is desired, the composition can be irradiated before or after the above-described Michael-analogous curing with electron beams or with UV light, in the presence of a photoinitiator in the composition, should the required wavelength range for the liberation of the amino compounds in b) be different from that required for free-radical curing.

In general, UV lamps with wavelength ranges from 240 to 400 nm and an output of from 50 to 150 W/cm appear suitable for liberating the amino compounds from b).

EXAMPLES

Test Methods

One measure of the reactivity is the rate (in m/min) at which the conveyor belt on which the samples to be irradiated lie can be led past the irradiating UV lamp. The pendulum hardness was determined in accordance with DIN 53 157. This is a measure of the hardness of the coating, higher values corresponding to harder coats.

The Erichsen indentation was determined in accordance with DIN ISO 1520. This is a measure of the flexibility and adhesion of the coating, higher values corresponding to more flexible coatings.

Example 1

A compound b) was prepared from hexamethylene diisocyanate and 2,6-dinitrobenzyl alcohol, as described in C. G. Illson et al., SPIE, Advances in Resist Technology and Processing X, Vol. 1925 (1993) 354–365.

169.2 parts by weight of b) and 118.52 parts by weight of 1,1,1-tris(hydroxymethyl)propane triacrylate were dissolved in diethylene glycol dimethyl ether, the solution was knife-coated onto a polyester film in a coat thickness of about 20 μm, and the coated film was dried in a convection oven at 60° C. for 20 minutes. The coating was subsequently irradiated on a conveyor belt. Freedom from tack was achieved with a conveyor-belt rate of 20 m/min. The pendulum hardness was 42 s, the Erichsen indentation 3.5 mm.

Comparison Example 1

67.8 parts of hexanediol diacrylate (the same molar proportion) were used in place of b) in Example 1. 4% by weight of IRGACUR® 500 photoinitiator was added and the subsequent procedure of Example 1 was followed. At a rate of 10 m/min, no tack-free film was obtained.

Example 2

90 parts by weight of (dimethyl-3,5-dimethoxybenzyloxy)carbonyl-N-cyclohexylamines and 57.8 parts by weight of dipentaerythritol penta/hexaacrylate were applied and exposed as in Example 1. The coating was tack-free and had a pendulum hardness of 52 s and an Erichsen indentation of 2.5 mm.

Examples 3 to 6

Following the procedure employed in Example 1, compounds b) were prepared from o-nitrobenzyl alcohol and hexamethylene diisocyanate (Example 3), isophorone diisocyanate (Example 4), the isocyanurate of hexamethylene diisocyanate (Example 5) and the biuret of hexamethylene diisocyanate (Example 6).

These compounds are mixed with a polyester acrylate (LAROMER® LR 8799, BASF) in stoichiometric quantities of acrylic groups to the amine hydrogen atoms. Preparation of the coating solutions, application and exposure gave tack-free films with the following reactivities and mechanical data:

| Example | Reactivity (m/min) | Pendulum hardness (s) | Erichsen indentation (mm) |
|---|---|---|---|
| 3 | 15 | 45 | 4.0 |
| 4 | 15 | 42 | 3.5 |
| 5 | 30 | 62 | 2.5 |
| 6 | 30 | 55 | 3.0 |

We claim:

1. A radiation-curable composition in which the curable constituents consist essentially of:
   (a) at least one ethylenically unsaturated copolymerizable compound which has at least two activated carbon-carbon double bonds characterized by the fact that it is possible for primary or secondary amino groups to form adducts in the form of a Michael-analogous addition reaction with each activated double bond, alone or with
   (a') a monofunctional ethylenically unsaturated compound which has one acrylic group, and
   (a") an other ethylenically unsaturated compound, constituent (a) constituting 50–100% by weight, constituent (a') constituting 0–20% by weight and constituent (a") constituting 0–50% by weight of the ethylenically unsaturated compounds, and
   (b) at least one capped amino compound which on irradiation with high-energy light liberates an amino compound having at least one amino group selected from the group consisting of primary and secondary amino groups, the overall number of amine hydrogen atoms bonded in the amino groups of the compound being at least 2.

2. A composition as claimed in claim 1, in which the activated double bonds are groups

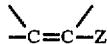

and Z is

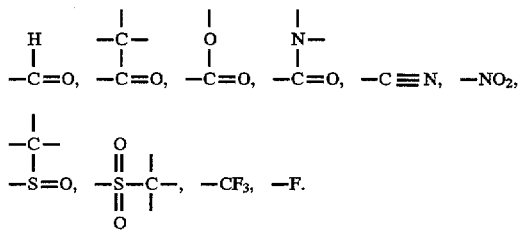

3. A composition as claimed in claim 1, wherein the compound (a) is an acrylate compound having at least two acrylic groups.

4. A composition as claimed in claim 1, wherein the molar ratio of the activated double bonds of (a) to the amine hydrogen atoms of (b) is from 1:0.2 to 1:1.2.

5. A composition as claimed in claim 3, wherein the acrylate compound (a) has from 2 to 6 acrylic groups.

6. A composition as claimed in claim 1, wherein from 100 to 50% by weight of the ethylenically unsaturated copolymerizable compounds present in the composition is an acrylate compound (a).

7. A composition as claimed in claim 1, wherein in the compound (b) amino groups are masked by photolabile organic protecting groups.

8. A molding or coating obtained by curing a composition as claimed in claim 1.

* * * * *